Nov. 23, 1948.   H. NYGAARD   2,454,401
ELECTRONIC MOTOR CONTROL SYSTEM
Filed Feb. 12, 1945   2 Sheets-Sheet 1

INVENTOR.
HERMAN NYGAARD
BY
*Richard A. Mason*
*his* ATTORNEY

Patented Nov. 23, 1948

2,454,401

UNITED STATES PATENT OFFICE 2,454,401

ELECTRONIC MOTOR CONTROL SYSTEM

Herman Nygaard, East Orange, N. J., assignor, by mesne assignments, to Lear, Incorporated, Grand Rapids, Mich., a corporation of Illinois Application February 12, 1945, Serial No. 577,426

20 Claims. (Cl. 318—30)

This invention relates to electronic motor control systems, and more particularly to such systems including electronic control means for stably following up the movement of a position selector.

The system of the present invention is particularly applicable to the remote control of the position of movable accessories on aircraft, for instance throttle controls, wing flaps, cowl flaps, landing gears, intercooler shutters, propeller speed governors, etc. On the larger aircraft, such movable accessories are usually positioned by means of power driven linear actuators, the operation of which is remotely controlled from a position adjacent the pilot's compartment. The present invention provides presettable positioning or follow up control of the driven member throughout its positionable range.

Electrical motor drive systems are replacing the more bulky hydraulic systems in many instances on aircraft. The present invention provides continuous remote positioning control of the available motors on aircraft actuators, whether operated from a low voltage direct current or higher voltage 400 cycle source. To save excessive drain on the power source, the control system is designed so that the power is used by the actuator motors only during their actual operating periods. Furthermore, there is a wide variety in the sizes and types of drive motors used aboard a modern aircraft. Under certain conditions, the use of direct current motors may be indicated; and under other conditions, alternating current motors. Each motor must be particularly designed for its particular application on an aircraft, taking into consideration the type of power economically available thereon, the load, and other conditions.

The principles of the present invention are applicable to any type or size of motor to be controlled, affording smooth and rapid operation of the controlled member, accurately to its new positions. The pilot need merely turn a dial to the required indicated position, and the motor is controlled to effect that new position of the member. No "stand-by" or other current is required to flow through the motor during non-operating conditions. Thus no power is wasted, nor is the motor ambient temperature raised. This feature is essentially provided through the use of a relay control of the motor, as will be set forth hereinafter.

Another important feature is the provision of novel effective anti-hunt or stability characteristics in the motor control system. In accordance with the invention, a signal or electrical effect produced as a result of the operation of the position selector, per se, is combined with the positioning or input signal to the electronic control means. This effects an "anticipation" for the control of the final position, and eliminates hunting in the drive system. Also, an electromagnetic clutch and brake unit is interposed between the motor and the actuator that abruptly disconnects the motor from the actuator as it approaches the final position, and also rapidly arrests motion of the actuator and driven member. Successive energization and deenergization of the clutch, brake and motor is afforded by the anticipation control to effect a stepping or chattering-in of the member to its final position. The clutch and brake unit is particularly effective in small, or "inching" movements as it disconnects the motor from the actuator and abruptly stops the latter. This further stabilizes the control system and can be made to effect rapid control movements on the member without hunting. Such stabilizing anticipation means is effective particularly for the relay controller for the motor, and renders such controller practical and feasible, particularly on aircraft.

It is among the objects of the present invention to provide an improved manual or automatic remote positioning control system including electronic follow-up means; to provide such a system which will insure rapid accurate positioning of a movable member driven by an electric motor; to provide such a control system having a narrow "dead" or back-lash zone, while, at the same time, having maximum sensitivity to small displacements of the position selector; to provide such a system which is universally applicable irrespective of the type and size of motor to which it is applied or of the type of motor power supply available; to provide such a system in which a signal derived in response to operation of the position selector is combined with the input signal to insure stability and anti-hunt characteristics in the system; to provide such a system including means for disconnecting the driving motor from the actuator and abruptly stopping the latter when the positionable accessory is in coincidence with the position selector; to provide such a system in which no stand-by current is required for the drive motor; and to provide such a system which includes relatively few parts and is light in weight, simple and reliable in operation for all types of aircraft or flight conditions.

These and other objects, advantages and features of the invention will be apparent from the following description and the accompanying drawings. In the drawings.

Generally speaking, the system of the present invention comprises a position selector operatively connected to a signal transmitter. The selector is effective to preselect the position of a movable member that is positioned by an actuator driven by an electric motor. A signal receiver is operatively associated with the actuator or the movable member, and electronic control means is provided connecting the signal receiver and signal transmitter. The control means is operative, upon receipt of an input signal due to angular disparity between the position selector and the movable member, to selectively operate relay means to energize the actuator motor for operation in the direction to restore coincidence between the position selector and the movable member. When the movable member attains coincidence with the position selector, the electronic control means operates to deenergize the relay means to disconnect the motor from its source. To avoid hunting of the movable member on either side of such coincident position, a counter signal responsive to operation of the position selector is combined with the input signal to effect accurate stopping of the actuator at such coincident position. The anti-hunt characteristics of the system are further improved by the use of an electromagnetic clutch and brake unit between the motor and actuator which operate to substantially instantaneously stop the actuator upon deenergization of the motor, affording accurate control in small or "inching" movements of the movable member.

Figure 1:
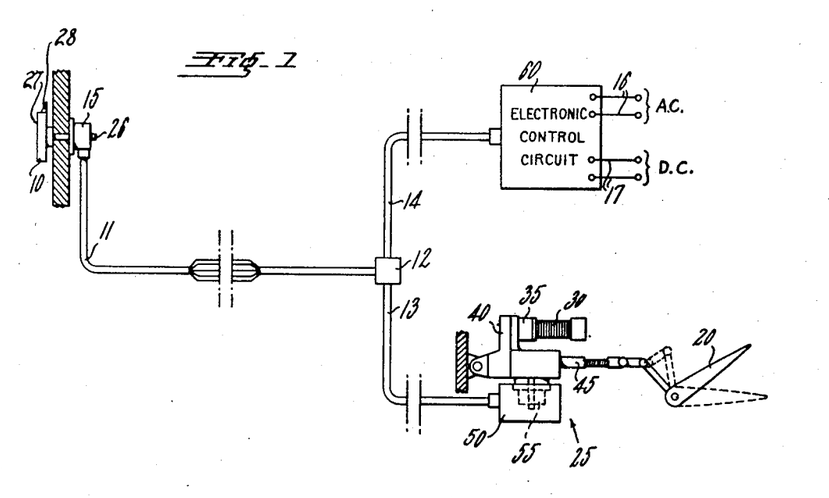
Fig. 1 is a schematic view of one embodiment of a remote positioning control system for a power actuated aircraft accessory, in accordance with the present invention.

Referring to the drawings, the system illustrated in Fig. 1 includes a position selector 10 operatively connected to a position signal transmitter 15. The position selector is arranged to control the position of a movable member 20 which may, for instance, be a wing flap of an aircraft. Movable member 20 is power operated by means of an actuator unit 25, which may be of the type described and claimed in copending application Serial No. 483,515 filed April 17, 1943 by William P. Lear for "Unitary mechanical actuator device," and assigned to the same assignee as this case. As described in said copending application, actuator unit 25 includes a motor 30 connected through an electromagnetic clutch and brake unit 35 and gear train 40 to a jack screw 45. A control box 50 is included in the actuator assembly and contains limit switches, and in the present case, a position signal receiver 55. A multi-conductor cable 11 connects signal transmitter 15 to a junction box 12, which, in turn, is connected by multi-conductor cables 13 and 14 to control box 50 of actuator unit 25 and electronic control circuit unit 60. Leads 16 connect unit 60 to a source of alternating current and leads 17 connect the unit to a source of direct current.

Figure 2:
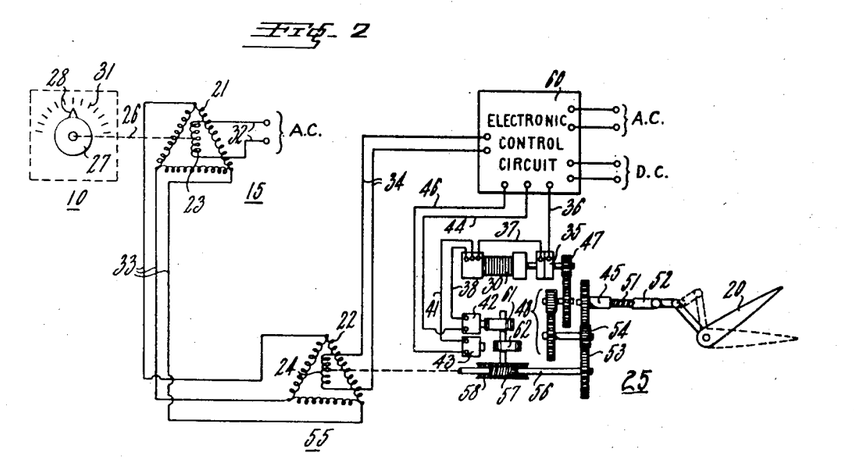
Fig. 2 is a schematic diagram of the remote positioning control system shown in Fig. 1.

Fig. 2 is a schematic showing of the components of Fig. 1. The transmitter 15 and receiver 55 are shown as "Selsyn" units including multi-phase stator windings 21 and 22, respectively, and rotor windings 23 and 24, respectively. Transmitter rotor winding 23 is adapted to be angularly displaced within stator windings 21, relative to receiver rotor winding 24, by a shaft 26 which is connected to selector 10, which may include a knob 27 having a pointer 28 adapted to cooperate with indicia 31.

A source of alternating current is connected to rotor winding 23 through leads 32. Due to the transformer action between rotor winding 23 and stator windings 21, multi-phase sinusoidal alternating fields are set up in stator windings 21. Leads 33 symmetrically interconnect stator windings 21 and 22 so that sinusoidal fields, corresponding in space and time relation with those in stator windings 21, are set up in stator windings 22 of unit 55. When rotor windings 23 and 24 have a relative angular displacement of 90 electrical degrees within their respective stator windings, no voltage is induced in receiver rotor winding 24. Such 90 degree relation is hereinafter referred to as the "null" position of the rotor windings.

When transmitter rotor winding 23 is angularly displaced from "null" relative to rotor winding 24, as through actuation of knob 27 to preselect a new position for member 20, an output voltage is induced in rotor winding 24. Leads 34 from winding 24 introduce this output voltage as an input signal or control voltage to electronic control circuit 60.

The magnitude of the resultant control voltage is proportional to the sine of the relative angle of displacement from null; and the phase of this control voltage is in-phase or 180° out-of-phase with the reference or source input to winding 23, dependent on the sense of the angular displacement. The control signal effects operation of the control circuits in unit 60 to effect selective connection of motor 30 to its source of power as will be described.

Motor 30 is connected to its source of power over a circuit which includes an energizing winding for electromagnetic clutch and brake unit 35 in circuit connection with the motor. For this purpose, where a series motor is used, one terminal of unit 35 is connected to unit 60 through lead 36, and the other terminal is connected to motor 30 through lead 37. The other two terminals of motor 30 are connected through leads 38 and 41 to terminals of limit switches 42 and 43. Leads 44 and 46 connect the other terminals of limit switches 42 and 43 to control unit 60. Energization of motor 30 and clutch and brake unit 35 connects motor 30 to a drive pinion 47. Drive pinion 47 operates jack screw 45 through a system of pinions and spur gears indicated generally at 48.

Gearing 48 causes jack screw 45 and member 20 to be operated at its proper reduced rate of speed with respect to motor 30. As described in said copending application Serial No. 485,515, jack screw 45 includes a screw member 51 having threaded engagement with a sleeve member 52. Relative rotation of jack members 51 and 52 effects extension and retraction of the jack screw to operate member 20. A spur gear 53 driven by a pinion 54, operates a shaft 56 connected to rotor 24 of unit 55. A worm 57 meshes with a worm gear 58 operating a pair of cams 61 and 62 which in turn cooperate with limit switches 42 and 43. Switches 42 and 43 may be so set that cams 61 and 62 will effect opening of the motor circuit when member 20 or jack screw 45 has mechanically reached its limit of operation in either direction.

As explained above, when there is a relative angular difference from the null or 90 degree relation in the position of rotor windings 23 and 24, a voltage is induced in rotor winding 24 proportional to the relative phase displacement of windings 23 and 24 from null relation within their respective stator windings. The voltage thus induced in winding 24 is applied through leads 34 to control unit 60 where, through connections to be described, it effects actuation of a differential relay for connecting motor 30 and clutch-brake unit 35 to a source of power for operation in a direction to restore coincidence between selector 10 and member 20. Unit 35 couples motor 30 to drive jack screw 45 through pinion 47 and gearing 48. At the same time, gear 53 and shaft 56 rotate receiver rotor winding 24 in correspondence with the movement of movable member 20.

When member 20 has reached the position corresponding to that indicated by pointer 28 of knob 27, receiver rotor winding 24 is geared to be in 90 degree or null phase relation with rotor winding 23. When rotor winding 24 is thus angularly related to rotor winding 23, the output or control signal voltage across its terminals will have decreased in value to zero. Hence, there will be no signal input through leads 34 to unit 60. The effect of the rotor windings reaching a "null signal" position is to deenergize motor 30 and clutch 35 effecting substantially instantaneous stopping of movable member 20 due to the braking action of unit 35 on actuator 25. Due to gearing 48, 53 and 54, rotor winding 24 is moved at a greatly reduced rate with respect to the rate of rotation of the armature of motor 30. To avoid any ambiguity of positioning, position transmitter rotor 23, and therefore position receiver rotor 24, designed to move in correspondence therewith, are not displaced more than 180° from null for the full range of control movement on member 20.

An important feature of the invention is the selective impressing of a counter or "anticipatory" signal upon electronic control unit 60 corresponsing to the amount and time of relative displacement from null of position selector 10 with respect to movable member 20. Such counter signal is combined in control unit 60 with the control signal from receiver 55 in a selective manner, dependent upon the direction of relative displacement of selector 10 with respect to movable member 20. The effect of the counter signal is to reduce the effective value of the control signal applied through leads 34 to unit 60 and effect deenergization of motor 30 somewhat before member 20 attains coincidence with selector 10. As will be made clear hereinafter, this effects a "stepping-in" or "chattering-in" of member 20 to the null or final position, inhibiting overshooting or hunting. By such null position is meant a substantially coincident phase or relation of the movable member and the selector in which the effective value of the signal voltage impressed from receiver 55 on control unit 60 is insufficient to effect operation of motor 30.

With the systems of the present invention, such null zone is shifted in the direction of relative displacement of selector 10 and movable member 20 to effect deenergization of motor 30 before the movable member and the selector have been returned to a substantially coincident position. Such shifting of the null zone also sensitively conditions the electronic control unit for operation of the motor in the opposite direction in the event movable member 20 overrides the coincident relation with selector 10 in a direction opposite to that of the original displacement. The shifting of the null zone renders the control unit extremely sensitive, in such event, to immediately restore movable member 20 to such coincident relation with selector 10.

In accordance with the present invention, the selective impressing of counter signals upon electronic control unit 60 occurs both as a result of the relative displacement of selector 10 with respect to member 20 and in response to energization of motor 30 due to such relative displacement. The counter signal responsive to the relative amount and time of displacement of selector 10 with respect to member 20 is effective for relatively large displacements. The counter signal means operative in response to energization of the motor 30 as a result of such relative displacement is particularly effective in relatively small displacements of selector 10 with respect to movable member 20. In a preferred embodiment of the invention, both methods of anticipation are employed simultaneously to make the system suitably sensitive for both relatively small and relatively large displacements of the selector with respect to the movable member.

Figure 3:
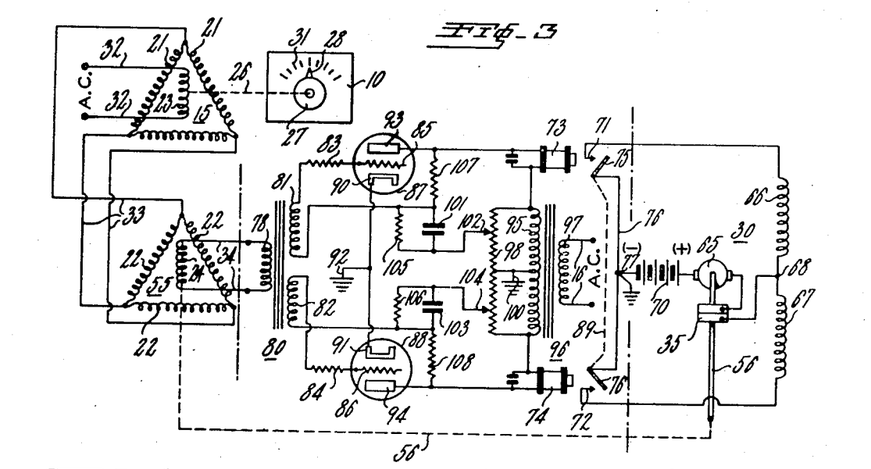
Fig. 3 is a schematic wiring diagram illustrating one embodiment of the electronic control circuit for the remote control system shown in Figs. 1 and 2.

Fig. 3 illustrates one embodiment of a control and anti-hunt arrangement for motor 30 as included in unit 60. In accordance with the invention, motor 30 may be a direct current series motor comprising an armature 65 and reversely wound field windings 66 and 67. One motor armature terminal is connected to one terminal of a source of direct current, such as a low voltage aircraft battery or generator 70, which may be the same as that represented by conductors 17 in Fig. 1. The other motor armature terminal is connected to a junction point 68 of field windings 66 and 67. The outer terminals of the field windings are connected respectively to front contacts 71 and 72 associated with relay operating coils 73 and 74. Relay armature sections 75 and 76 are shown commonly connected to the other terminal of source 70 through junction point 77.

Figure 3A:
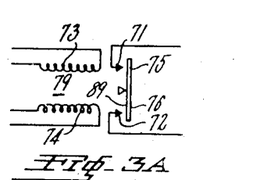
Fig. 3A is a schematic view of a differential relay used in the invention control system.
Figure 4:
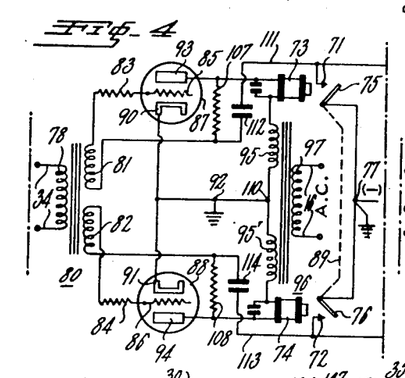
Fig. 4 is a schematic wiring diagram illustrating another embodiment of the electronic control circuit.
Figure 5:
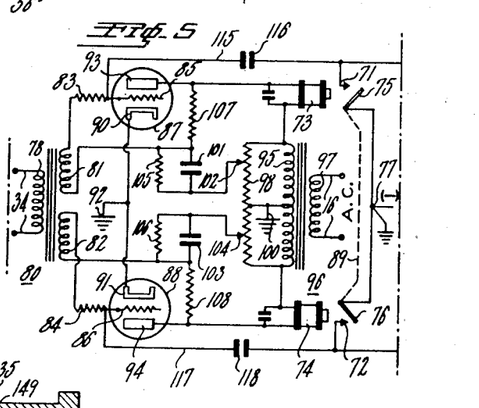
Fig. 5 is a schematic wiring diagram illustrating still another embodiment of the electronic circuit.

While relay coils 73 and 74 have been shown as separate relays in Fig. 3, and also in Figs. 4 and 5, this is merely for convenience and clarity of illustration. Both coils are part of a single differential relay 79, such as shown schematically in Fig. 3A. This differential relay includes operating coils 73 and 74, a pivoted armature 89 including armature sections 75 and 76, and front contacts 71 and 72, each operatively associated with one armature section. Pivoted armature 89 is indicated in Figs. 3, 4 and 5 by the dotted line 89 interconnecting the pivoted points of armature sections 75 and 76, which sections have been shown separated in these figures for convenience of illustration.

Engagement of the relay armature with either contact 71 or 72 will cause motor 30 to be energized through one field winding 66 or 67 for selective operation in reverse directions. Use of relay 79 with the control circuit of the invention permits any type or size of motor to be used for motor 30, depending upon the particular source of power economically available and the particular application for which the motor is intended.

The terminals of signal receiver rotor winding 24 are connected through leads 34 to the primary winding 78 of a grid transformer 80, thus impressing the control signal thereon. Transformer 80 is provided with a pair of secondary windings 81 and 82. A corresponding pair of terminals of windings 81 and 82 are connected, through limiting resistors 83 and 84, to control grids 85 and 86, respectively, of a pair of electronic amplifier tube paths 87 and 88. Tube paths 87 and 88 are respectively provided with cathodes 90 and 91 interconnected to ground at 92, and with anodes 93 and 94. Anodes 93 and 94 are each connected to one terminal of a relay operating coil 73 or 74. The opposite terminals of coils 73, 74 are connected to the end terminals of the secondary winding 95 of a transformer 96 having a primary winding 97. Primary winding 97 of the transformer is connected to a source of alternating current which, for control purpose, is the same reference source to which rotor winding 23 is connected, and may be that indicated by the leads 16 of Fig. 1. It will be noted that the respective connections are such that the reference voltage is impressed in phase-opposition on anodes 93, 94, and the reference signal voltage is impressed in in-phase relation on grids 85 and 86.

The use of differential relay 79 is an important feature in the circuit of the invention as it contributes greatly to the accuracy, sensitivity and stability of control. The single pivoted armature 89, common to both relay coils 73 and 74, prevents accidental simultaneous energizing of motor 30 for reverse directions of rotation at the same time, as might occur, were two separate relay armatures used.

Under null conditions, the effective bias of grids 85 and 86 is such that tubes 87 and 88 are conditioned to pass relatively small and equal currents through coils 73 and 74. In a typical practical example, such current might be of the order of six milliamperes. As the same current passes through both relay coils, there is no net effect on armature 89, and the latter remains in its neutral or balanced position. When a control signal is impressed on transformer 80 in response to relative displacement of rotors 23 and 24, the current flowing through one tube is increased and that through the other tube is decreased. For example, such increase and decrease in current might be of the order of two milliamperes. The effective current through the selectively operated one of the relay coils would then be eight milliamperes whereas that through the other relay coil will be reduced to four milliamperes. The net relay or differential current operating the relay armature will therefore be four milliamperes.

The described effect greatly increases the sensitivity of response of differential relay 79 as compared to two separate relays. Under the same conditions, the current flowing through two separate relays must be reduced in value in order to prevent accidental operating of the separate relay armatures. If the current through one of such separate relays is increased due to the imposition of a signal voltage on transformer 80, the decrease in current through the other relay will not assist in operation of the selected relay armature. Accordingly, a pair of separate relays require a greater signal voltage to be impressed on grid transformer 80 to effectively operate their armatures. It will thus be apparent that differential relay 79 contributes greatly to the accuracy, stability and sensitivity of the control system.

A potentiometer 98 is connected in parallel with secondary winding 95 and the mid-points of the potentiometer and secondary windings are interconnected and grounded at 100. The other terminals of secondary windings 81 and 82 are connected, through condensers 101 and 103 to adjustable contacts 102 and 104 of potentiometer 98, respectively. Fixed resistors 105 and 106 are respectively connected in parallel with condensers 101 and 103. One junction point of condenser 101 and resistor 105 is connected to anode 93 through resistor 107. Similarly, a junction point of condenser 103 and resistor 106 is connected to anode 94 through resistor 108.

The operation of the control circuit shown in Fig. 3 is as follows. Contacts 102 and 104 are so adjusted as to bias grids 85 and 86 to condition tubes 87 and 88 to pass small and equal currents through coils 73 and 74, retaining armature 89 in its neutral or balanced position when rotors 23, 24 are in null relation. Upon a displacement of rotor winding 23 through movement of selector knob 27, an alternating current "control" or signal voltage is induced in rotor winding 24 and impressed through leads 34 upon primary 78 of transformer 80. Through secondary windings 81, 82 of the transformer, a proportionally higher voltage is impressed in in-phase relation, on grids 85 and 86 of electronic tubes 87 and 88, through limiting resistors 83 and 84. Depending upon the direction of displacement of winding 23 from its previous null position, one tube 87 or 88 will become more conductive and the other less conductive. Transformer secondary winding 95 displaces the potential of anodes 93, 94 by 180 electrical degrees. The sense or phase of the resultant control signal will accordingly be in phase with the anode voltage of one or the other of tubes 87, 88 and render them selectively conductive. Of course, the grids may be energized in phase-opposition, and the anodes in in-phase relation, if desired.

In either event, the current through relay coils 73 and 74 will be unbalanced to bias armature 89 into engagement with contact 71 or 72, dependent upon the relative phase of the control or signal voltage or sense of rotor 23 displacement. This operation effects energization of clutch unit 35 and motor 30 through one of the latter's field windings 66 or 67 in such a direction as to cause the motor to rotate in a direction to operate member 20 and bring receiver rotor winding 24 into angular coincidence with transmitter rotor winding 23. When the rotor windings are again in null relation, which occurs when movable member 20 substantially coincides in relative position with selector knob 27, the input signal voltage to grid primary winding 78 will be reduced to its null value, which conditions tubes 87 or 88 to be equally conductive, thus balancing the operating currents of relay coils 73 and 74. Armature 89 is swung to its neutral or balanced position and the motor circuit is broken at contact 71 or 72. Clutch-brake unit 35 operates to substantially instantaneously stop actuator 45 and movable member 20, in a manner described in more detail hereinafter.

Despite such substantially instantaneous action of clutch-brake unit 35 in disconnecting motor 30 from actuator 45, there may be a tendency for motor 30 to move rotor winding 24 beyond its null position with respect to rotor winding 23. This will induce a reversely directed signal voltage into primary winding 78, causing tubes 87 and 88 to be conditioned to operate differential relay 79 to operate motor 30 in the reverse direction before a steady state is reached. A suitable anticipation or anti-hunt means is provided to prevent such tendency to hunt in the system shown in Fig. 3.

In the system illustrated in Fig. 3, the counter, or anti-hunt signal is derived in the following manner. Assuming that tube 87 is the one conditioned to be more conductive, an increased current will flow in both its plate and grid circuits. Through its connection to secondary winding 81, condenser resistor combination 101, 105 is connected in the circuit of control grid 85. Accordingly, a potential is impressed across condenser 101 causing a counter signal to be stored therein during the time knob 27 is being displaced with respect to movable member 20. The final voltage across condenser 101 will be substantially equal to the peak voltage drop across resistance 105. As motor 30 starts to rotate member 20 back into coincident relation with selector knob 27, and thus to rotate rotor winding 24 into null relation with rotor winding 23, the counter signal potential stored in condenser 101 is impressed upon grid 85. During such movement of member 20 into coincident relation with selector 10, the charge on condenser 101 gradually leaks off through resistor 105.

However, this leaking action is at such rate that the counter signal potential from condenser 101 decreases at a rate less than the rate of decrease of the signal voltage impressed on grid 85 from secondary winding 81 due to such movement. The counter signal potential is likewise in a direction to oppose the signal voltage impressed on grid 85 from winding 81, and to oppose the activating potential impressed on anode 93 from transformer secondary winding 95.

The effect of these two actions is to reduce the conductivity of tube 87 to normal or less than normal before rotor winding 24 has attained full coincidence with rotor winding 23. That is, the effective activating voltage for tube 87, and the effective signal voltage impressed on its grid 85, are decreased below the values they would normally be. Relay 79 accordingly operates its armature 89 to break the motor circuit at contact 71. Movement of rotor winding 24 then stops, with winding 24 in a non-null relation with winding 23. However, the charge on condenser 101 continues to leak off through resistance 105. Accordingly, after an interval of time, the values of the activating potential applied to anode 93 and of the signal voltage applied to grid 85 become sufficient to again render tube 87 more conductive than tube 88. Thus, relay 79 again operates armature 89 to engage contact 71 and motor 30 again moves rotor 24 toward a null relation with rotor 23. The result of the two actions described above is to effect a "chattering-in" or "stepping-in" of motor 30, and hence of rotor 24, into the final or null position.

Resistors 107 and 108, together with resistors 105 and 106, and potentiometer 98 form shunt circuits around the loads represented by relay coils 73 and 74. As the flow of current through 73 or 74 increases, the bias on the associated grid 85 or 86 is reduced.

In the example cited above, tube 87 was the one made more conductive than normal, and hence a substantial counter signal potential was stored in condenser 101. As tube 88 was made less conductive than normal, no counter signal potential was stored in its associated condenser 103. However, the signal voltage impressed on grid 86 of tube 88 from transformer 80 is the same as that impressed on grid 85 of tube 87. Accordingly, tube 88 remains at its full sensitivity with respect to the signal voltage impressed thereon. Should, despite the above arrangement, the rotor 24 overshoot its final position with respect to rotor 23, tube 88 would immediately become more conductive than normal to energize relay 79 in a direction to engage armature 89 with contact 72 and thus energize motor 30 for rotation in the reverse direction to angularly align member 20 and selector 10.

The effective result of the actions described above is to "shift" the null zone in the direction of the original displacement of knob 27 with respect to movable member 20. Accordingly, effective inhibition of hunting is accomplished as rotor 24 is moved in the opposite direction toward null relation with rotor 23. At the same time, the sensitivity of the circuit to movement of selector knob 27 in the opposite direction is not destroyed, as the other tube 87 or 88 remains fully sensitive to effect energization of motor 30 in the reverse direction.

Fig. 4 illustrates another embodiment which the invention may assume in practice. To simplify the drawing, signal transmitter 15 and signal receiver 55 and their connections, and motor 30, clutch-brake unit 35 and their connections, outside the broken lines of Fig. 3, have been omitted. It is to be understood that such connections are identical with those in Fig. 3. Likewise, the parts of Fig. 4 corresponding to Fig. 3 have been given identical reference numerals. Resistors 107, 108, and the arrangements shown in Fig. 4, do not form part of shunt circuits as in Fig. 3. Here, these resistors operate only to give feedback characteristics due directly to the anode connection, and to limit the flow from plate to ground when the relays are closed.

In the embodiment shown in Fig. 4, the signal from rotor winding 24 is again impressed through leads 34 on primary winding 78. The secondary windings 81 and 82 are connected to grids 85 and 86 in the same manner as in Fig. 3. Similarly, the opposite pair of terminals of windings 81 and 82 are connected through resistors 107 and 108 respectively to anodes 93 and 94. However, the resistor-condenser combinations 101, 105 and 103, 106 of Fig. 3, are omitted. Transformer 96 is provided with a primary winding 97 and a split secondary winding 95, 95'. The ground point 92 for cathodes 90 and 91 is connected to the common junction 110 of windings 95 and 95'.

Front contact 71 is connected through a conductor 111 and a condenser 112 to the grid and anode circuits of tube 87. The connection to the anode circuit is made through resistor 107, and that to the grid circuit through secondary winding 81 and limiting resistor 83. In a similar manner, front contact 72 is connected through conductor 113 and condenser 114 to the anode and grid circuits of tube 88.

The anti-hunting arrangement shown in Fig. 3, is effective only upon relatively large displacements of rotors 23 and 24 due to the time necessary for an effective counter potential to be built up in the resistance-condenser anticipation arrangement. Accordingly, the anticipation arrangement of Fig. 3 is not effective for relatively small displacements of rotors 23 and 24. The system of Fig. 4 is effective for such relatively small displacements.

The system of Fig. 4 operates in the following manner. The signal voltage impressed on primary winding 78 causes a proportionately higher voltage to be impressed on grids 85 and 86 through grid current limiting resistors 83 and 84 respectively, in in-phase relation. Anodes 93 and 94 are connected to windings 95 and 95' in phase-opposition. Accordingly, one tube 87 or 88 will become more conductive and the other less conductive depending upon the direction of relative displacement of position selector knob 27 with respect to movable member 20. Let us assume that, under a given set of conditions, the displacement is in such a direction as to make tube 87 more conductive. Under such conditions, the current through relay coil 73 will be increased and that through coil 74 decreased, thus engaging armature section 75 with contact 71 to energize motor 30 and clutch-brake unit 35 in a direction to rotate shaft 56 to restore movable member 20 to a coincident position with respect to selector knob 27.

Immediately upon engagement of armature 89 with contact 71, the alternating current potentials applied to the anode and grid circuits of tube 87 are grounded at the negative terminal of source 70 through condenser 112 and conductor 111. Condenser 112 prevents the flow of direct current through conductor 111. Such grounding effects a sharp reduction in the effective values of the A. C. activating potential and signal voltage applied to tube 87. Accordingly, with a relatively small displacement resulting in a relatively small signal voltage being impressed on grids 85 and 86, the conductivity of tube 87 is immediately decreased to normal, operating relay 79 to break the energizing circuit of motor 30 and disconnect the same from movable member 20 through clutch-brake unit 35. However, such anticipation effect is only momentary. Should the displacement of knob 27 with respect to member 20 be relatively large, the reduction in the A. C. signal voltage and activating potential will not be sufficient to immediately reduce the conductivity of tube 87 to normal.

However, when movable member 20 has almost reached the position of coincidence with selector knob 27, the signal voltage will be reduced to a value where it is insufficient to condition tubes 87 and 88 and relay 79 to energize motor 30. De-energization of motor 30 immediately removes the negative potental connection from the grid and anode circuits of tube 87. Accordingly, if the rotors 23 and 24 are not in null relation, a signal voltage will still be impressed on grid 85 which will again condition tubes 87 and 88 to operate relay 79 to engage armature 89 with contact 71. The result is to effect a chattering-in or stepping-in of motor 30 to the final position in a manner similar to that described in Fig. 3.

It will be noted that the described desensitizing effect takes place only with respect to one tube 87 or 88. The other tube remains fully sensitive so that, in the event selector knob 27 is displaced in the opposite direction, the control system will respond immediately to such opposite displacement. This greatly increases the sensitivity of the control circuit.

Fig. 5 illustrates another embodiment of the control circuit of the invention including anti-hunting or anticipation means effective on both small and large relative displacements of rotor 23 and 24. The circuit illustrated in Fig. 5 is generally similar to that illustrated in Fig. 3, with an anti-hunting or anticipation arrangement effective on small relative displacements of the rotors 23, 24 being superposed thereon. Accordingly, elements identical with those in Fig. 3 have been given the same reference numbers.

The operation of the control circuit illustrated in Fig. 5 on relatively large displacements of rotors 23 and 24 with respect to each other is identical to that described in connection with Fig. 3. That is, a counter signal potential is built up on either condenser 101 or 103 depending upon which of the tubes 87, 88 is made more conductive than the other. This counter signal potential, during operation of the motor to restore coincidence between member 20 and selector 10 opposes the signal voltage impressed on grids 85 and 86 to effect a rebalance of the conductivities of tubes 87 and 88 before the position selector and the movable member have obtained substantially full coincidence. This accordingly effects a shifting of the null zone in the same manner as described in connection with Fig. 3 while retaining the circuit at its full sensitivity for any further displacement of the selector in the opposite direction from that of the original displacement.

To provide anticipation and anti-hunting on relatively small displacements of rotors 23 and 24, grid 85 is connected to front contact 71 of relay 75 through a conductor 115 and a condenser 116. Similarly, grid 86 is connected to front contact 72 of relay 75 through a conductor 117 and a condenser 118. Accordingly, immediately upon operation of differential relay 79, either grid 85 or 86 is connected through armature 89 and contact 71 or 72 to the negative terminal of source 70. The A. C. signal potential is thus grounded, the voltage reduction being limited by grid resistors 83, 84. This immediately reduces the bias of grid 85 or 86 to a value insufficient to make its associated tube 87 or 88 more conductive than the other tube. Accordingly, the tubes immediately become equally conductive, disengaging armature 89 from contact 71 or 72 to deenergize motor 30. Upon such disengagement of relay armature 89, the ground is removed from the A. C. signal potential applied to grid 85 or 86 and the signal voltage is then sufficient to condition tubes 87 and 88 to actuate differential relay 79. The result of these actions is to effect a "chattering-in" or "stepping-in" of the rotors 23 or 24 into their substantially null position.

Upon relatively large displacement of rotors 23 and 24 with respect to each other, the A. C. signal voltage impressed on grids 85 and 86 from transformer 80 is sufficiently large in value that the partial grounding thereof through closure of relay armatures 89 in either direction is insufficient to reduce the effective signal voltage below a value sufficient to condition the tubes to actuate relay 79. However, on such relatively large displacement, the anti-hunting arrangement including the two condenser-resistance combinations takes control and likewise effects a chattering-in or stepping-in of the motor into the final position in the manner previously described. It will be noted that Fig. 5 includes two anticipation or anti-hunting arrangements, one effective during relatively large displacements of the position selector and movable member and one effective during relatively small displacements thereof. Accordingly, Fig. 5 is a circuit of universal applicability due to its effective operation on either small or large relative displacements of rotors 23 and 24.

It should be understood, however, that both the anticipation effect on relatively large displacements and the anticipation effect on relatively small displacements are operable not alternatively but simultaneously. That is, during an average displacement of the signal transmitter and receiver rotors from their null position, the resistance-condenser combination will effect anticipation during restoring movement of the receiver rotor from its maximum displacement until the rotors are almost in the null position. At such time, the effect of the resistor-condensor combination on the system will be relatively less strong than the effect of the relay "kick-back" anticipation effect thereon. Accordingly, during the final movement of the receiver rotor into its null relation with the transmitter rotor, the relay "kick-back" anticipation effect will control. Thus, both anticipation effects are operative during an average displacement of the rotors from their null relation.

An important feature of the present invention is the electromagnetic clutch and brake unit 35 provided for connecting motor 30 to jack screw 45. As explained above, the clutch and brake unit is in electric circuit relation with motor 30 so that it is energized when motor 30 is energized to instantly couple the motor to the jack screw actuator. When motor 30 is deenergized, clutch unit 35 is immediately deenergized and instantly brakes the actuator and associated elements. This action is very effective in preventing overshooting and hunting of the motor drive and of the control system. The effect of motor momentum is minimized. The electromagnetic clutch and brake unit 35 may be of the type described and claimed in Patent No. 2,267,114 entitled "Electromagnetic clutch" issued December 23, 1941 to William P. Lear, or Patent No. 2,401,003 entitled "Electromagnetic clutch" issued May 28, 1946 to William P. Lear, both assigned to the same assignee as the present case. For purpose of illustration, the electromagnetic clutch and brake unit described in said latter patent is illustrated in Fig. 6.

Figure 6:
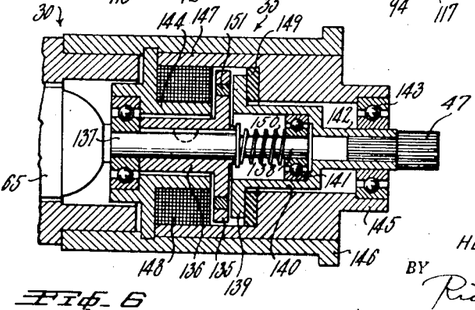
Fig. 6 is a longitudinal sectional view through an electromagnetic clutch and brake unit used in the control system.

Referring to Fig. 6, the electromagnetic clutch and brake unit 35 includes a driving member 135 of magnetic material having a hub portion 136 keyed to the shaft 137 of armature 65 of motor 30. Armature shaft 137 is provided with a reduced extension 138. Mounted on extension 138 is driven clutch member 139 likewise of magnetic material and having a hub portion 140 concentric with extension 138 and supported thereon through ball bearings 141. Hub portion 140 is provided with a reduced extension 142 which is mounted on ball bearings 143 in a member 145 disposed in a housing 146. Drive pinion 47 is mounted in the outer end of extension 142. A housing 144 of magnetic material surrounds hub portion 136 of driven member 135, the housing being completed by an extension 147 of housing 145.

Mounted in the compartment thus formed is a magnetizing winding 148 which is preferably connected in electric circuit relation with motor 30 either in series or parallel relation. A brake surface 149 of suitable material, such as cork, is mounted in housing 145 adjacent driven clutch member 139. A spring 150 surrounding armature shaft extension 138 abuts driving member 135 and ball bearing assembly 141 to normally urge driven member 139 into engagement with brake surface 149. As described in said Patent No. 2,267,114, driving member 135 may be provided with one or more inserts 151 of non-magnetic material to increase the number of magnetic flux interlinkages between the driving and driven members of the clutch.

Upon energization of winding 148, driven member 139 is magnetically attracted into frictional and magnetic coaction with driving member 135 to couple armature shaft 137 to pinion 47. The magnetic attraction between the driving and driven members overcomes the force of spring 150. Upon deenergization of winding 148, which preferably occurs simultaneously with deenergization of motor 30, spring 150 snaps driven disk 139 into instantaneous engagement with braking surface 149. This instantly disconnects motor 30 from pinion 47 and effects immediate stopping of the driven system connected to pinion 47. The armature 65 of motor 30 may rotate at a decreasing rate due to the stored kinetic energy without moving pinion 47. Accordingly, any tendency for the driven system connected to pinion 47 to hunt on either side of the null position, is effectively inhibited due to the instantaneous braking action of clutch and brake unit 35 when motor 30 is deenergized in response to the control signal reaching zero when signal transmitter 15 and signal receiver 55 are in null relation. The clutch and brake unit is particularly effective in small or "inching" movements of the system.

While specific embodiments of the invention have been described for the purpose of illustrating the principles thereof, it will be obvious to those skilled in the art that the invention may be otherwise embodied without departing from such principles.

What is claimed is:

1. A position control system for a movable member comprising, in combination, an electric motor operable to position the member; switch means selectively operable to connect said motor to a source of power for rotation in either direction; a pair of electronic tube paths selectively controlling the operation of said switch means; means, including circuit connections, for impressing a control signal voltage on the control grids of said tube paths to selectively condition one of said tube paths to selectively operate said switch means; and means, in individual circuit connection with the anode of each of said tube paths, effective to render the selectively conditioned tube path less sensitive than the other tube path to effect deenergization of said motor before the movable member attains a position corresponding to the control signal to inhibit hunting of the movable member.

2. A position control system for a movable member comprising, in combination, an electric motor operable to position the member; switch means selectively operable to connect said motor to a source of power for rotation in either direction; a pair of electronic tube paths selectively controlling the operation of said switch means; means, including circuit connections, for impressing a control signal voltage on the control grids of said tube paths to selectively condition one of said tube paths to selectively operate said switch means; and means, in individual circuit connection with the anode of each of said tube paths, for storing a counter signal potential corresponding to the magnitude of the signal voltage and effective to render the selectively conditioned tube path less sensitive than the other tube path to effect deenergization of said motor before the movable member attains a position corresponding to the control signal to inhibit hunting of the movable member.

3. A position control system for a movable member comprising, in combination, an electric motor operable to position the member; switch means selectively operable to connect said motor to a source of power for rotation in either direction; a pair of electronic tube paths selectively controlling the operation of said switch means; means, including circuit connections, for impressing a control signal voltage on the control grids of said tube paths to selectively condition one of said tube paths to selectively operate said switch means; and means, in individual circuit connection with the anode of each of said tube paths, operable in response to operation of said switch means to decrease the operating potential of the selectively conditioned tube path to render the selectively conditioned tube path less sensitive than the other tube path to effect deenergization of said motor before the movable member attains a position corresponding to the control signal to inhibit hunting of the movable member.

4. A position control system for a movable member comprising, in combination, an electric motor operable to position the member; switch means selectively operable to connect said motor to a source of power for rotation in either direction; a pair of electronic tube paths selectively controlling the operation of said switch means; means, including circuit connections, for impressing a control signal voltage on the control grids of said tube paths to selectively condition one of said tube paths to selectively operate said switch means; means, in individual circuit connection with each of said tube paths, for storing a counter signal potential corresponding to the magnitude of the signal voltage and effective to render the selectively conditioned tube path less sensitive than the other tube path to effect deenergization of said motor before the movable member attains a position corresponding to the control signal to inhibit hunting of the movable member; and means, in individual circuit connection with each of said tube paths, operable in response to operation of said switch means to decrease the operating potential of the selectively conditioned tube path to render the selectively conditioned tube path less sensitive than the other tube path to effect deenergization of said motor before the movable member attains a position corresponding to the control signal to inhibit hunting of the movable member.

5. A motor control circuit comprising an electric motor; a device operable to vary the value of a given condition with respect to a reference value; mechanism, including a differential relay having a pair of operating coils and a pivoted armature, operable to connect said motor to a source of power and to said device; a pair of electronic tube paths each connected in circuit relation with one of said relay operating coils and selectively operable, when conditioned, to operate said mechanism and said relay; means responsive to a change in such condition from such reference value to impress on the grid circuit of said electronic tube paths a signal voltage proportional to such change to selectively condition said electronic tube paths to operate said mechanism to energize said motor and connect it to said device to operate the latter in a direction to restore such condition to such reference value; and separate means each connected in individual circuit relation with the anode and control grid circuit of one of said tube paths for storing a counter signal potential during activation of its associated tube proportional to such condition change and impressing such counter signal potential upon its associated tube path in opposition to the signal voltage impressed upon the control grid thereof to condition said tube paths to operate said mechanism to deenergize said motor and disconnect it from said device before such condition has been restored to such reference value to inhibit hunting of the control system; the effective signal voltage on the control grid of the other tube path reaching a value insufficient to condition said tubes to effect energization of said motor only when such condition has substantially reattained such reference value.

6. A motor control circuit comprising an electric motor; a device operable to vary the value of a given condition with respect to a reference value; mechanism, including a differential relay having a pair of operating coils and a pivoted armature, operable to connect said motor to a source of power and to said device; a pair of electronic tube paths each connected in circuit relation with one of said relay operating coils and selectively operable, when conditioned, to operate said mechanism and said relay; means responsive to a change in such condition from such reference value to impress on the grid circuit of said electronic tube paths a signal voltage proportional to such change to selectively condition said electronic tube paths to operate said mechanism to energize said motor and connect it to said device to operate the latter in a direction to restore such condition to such reference value; and circuit means individual to each tube path and operative immediately upon energization of said relay to reduce the operating potential applied from such reference source to the associated tube path to condition said tube paths to operate said mechanism to deenergize said motor and disconnect it from said device before such condition has been restored to such reference value to inhibit hunting of the control system; the operating potential applied to the other tube path remaining unchanged during such movement.

7. A motor control circuit comprising an electric motor; a device operable to vary the value of a given condition with respect to a reference value; mechanism, including a differential relay having a pair of operating coils and a pivoted armature, operable to connect said motor to a source of power and to said device; a pair of electronic tube paths each connected in circuit relation with one of said relay operating coils and selectively operable, when conditioned, to operate said mechanism and said relay; means responsive to a change in such condition from such reference value to impress on the grid circuit of said electronic tube paths a signal voltage proportional to such change to selectively condition said electronic tube paths to operate said mechanism to energize said motor and connect it to said device to operate the latter in a direction to restore such condition to such reference value; separate means each connected in individual circuit relation with the anode and control grid circuit of one of said tube paths for storing a counter signal potential during activation of its associated tube proportional to such condition change an impressing such counter signal potential upon its associated tube path in opposition to the signal voltage impressed upon the control grid thereof to condition said tube paths to operate said mechanism to deenergize said motor and disconnect it from said device before such condition has been restored to such reference value to inhibit hunting of the control system; the effective signal voltage on the control grid of the other tube path reaching a value insufficient to condition said tube paths to effect energization of said motor only when such condition has substantially reattained such reference value; and other hunting inhibiting means comprising circuit means individual to each tube path and operative upon energization of said relay to reduce the operating potential applied from such reference source to the associated tube path to condition said tube paths to operate said mechanism to deenergize said motor and disconnect it from said device before such condition has been restored to such reference value to inhibit hunting of the control system; the operating potential applied to the other tube path remaining unchanged during such movement.

8. A remote positioning control system for a movable member comprising, in combination, a position selector; a signal transmitter operatively associated with said selector; an actuator effective to position the movable member; an electric motor; mechanism, including relay means, operable to connect said motor to a source of power and mechanically to said actuator; a signal receiver operable in accordance with movement of the movable member; electrical means connecting said receiver and said transmitter; a pair of electronic tubes each connected in circuit relation with one of said relay means and a reference source of alternating current; means including circuit connections for selectively impressing a signal voltage from such reference source on said tubes in response to signals derived by said receiver from said transmitter when said selector and the movable member are out of coincidence to selectively condition said tubes to actuate said mechanism and operate said relay means to energize said motor and connect it to said actuator for rotation in a direction to restore coincidence between the movable member and said selector; a substantially coincident relation of the movable member and said selector corresponding to a null zone in which the resultant effective value of the signal voltage impressed on said tubes is insufficient to condition said tubes to operate said mechanism; means connected in individual circuit relation with the anode of each of said tubes for storing a counter signal potential during movement of said selector and the movable member out of coincidence and corresponding to the resultant relative displacement of said transmitter and receiver; and circuit means for impressing such counter signal potential on the associated one of said tubes in a direction to oppose the signal voltage thereon during movement of the member and said selector into coincidence, such counter signal potential exceeding such signal voltage when the member and said selector approach coincidence to shift such null zone in a direction to condition said tubes to operate said mechanism to deenergize said motor and disconnect it from said actuator before the movable member and said selector attain coincidence, whereby to inhibit relative hunting thereof; the effective signal voltage on the other tube reaching a value sufficient to condition said tubes to effect energization of said motor only when the movable member and said selector have attained substantially full coincidence.

9. A remote positioning control system for a movable member comprising, in combination, a position selector; a signal transmitter operatively associated with said selector; an actuator effective to position the movable member; an electric motor; mechanism, including relay means, operable to connect said motor to a source of power and mechanically to said actuator; a signal receiver operable in accordance with movement of the movable member; electrical means connecting said receiver and said transmitter; a pair of electronic tubes each connected in circuit relation with one of said relay means and a reference source of alternating current; means including circuit connections for selectively impressing a signal voltage from such reference source on said tubes in response to signals derived by said receiver from said transmitter when said selector and the movable member are out of coincidence to selectively condition said tubes to actuate said mechanism and operate said relay means to energize said motor and connect it to said actuator for rotation in a direction to restore coincidence between the movable member and said selector; a substantially coincident relation of the movable member and said selector corresponding to a null zone in which the resultant effective value of the signal voltage impressed on said tubes is insufficient to condition said tubes to operate said mechanism; means connected in individual circuit relation with the anode of each of said tubes for storing a counter signal potential during movement of said selector and the movable member out of coincidence and corresponding to the resultant relative displacement of said transmitter and receiver; and circuit means for impressing such counter signal potential on the associated one of said tubes in a direction to oppose the signal voltage thereon during movement of the member and said selector into coincidence, and including means for dissipating such stored counter signal potential, as the member and said selector are moved toward coincidence, at a rate less than the rate of decrease of such signal voltage due to such movement; such counter signal potential exceeding such signal voltage when the member and said selector approach coincidence to shift such null zone in a direction to condition said tubes to operate said mechanism to deenergize said motor and disconnect it from said actuator before the movable member and said selector attain coincidence, whereby to inhibit relative hunting thereof; the effective signal voltage on the other tube reaching of a value sufficient to condition said tubes to effect energization of said motor only when the movable member and said selector have attained substantially full coincidence.

10. A remote positioning control system for a movable member comprising, in combination, a position selector; a signal transmitter operatively associated with said selector; an actuator effective to position the movable member; an electric motor; mechanism, including relay means, operable to connect said motor to a source of power and mechanically to said actuator; a signal receiver operable in accordance with movement of the movable member; electrical means connecting said receiver and said transmitter; a pair of electronic tubes each connected in circuit relation with one of said relay means and a reference source of alternating current; means including circuit connections for selectively impressing a signal voltage from such reference source on said tubes in response to signals derived by said receiver from said transmitter when said selector and the movable member are out of coincidence to selectively condition said tubes to actuate said mechanism and operate said relay means to energize said motor and connect it to said actuator for rotation in a direction to restore coincidence between the movable member and said selector; a substantially coincident relation of the movable member and said selector corresponding to a null zone in which the resultant effective value of the signal voltage impressed on said tubes is insufficient to condition said tubes to operate said mechanism; and circuit means individual to the anode of each tube and operative upon energization of said relay means to reduce the operating potential applied from such reference source to the associated tube in a direction to condition said tubes to operate said mechanism to deenergize said motor and disconnect it from said actuator before the member and said selector attain coincidence, whereby to inhibit relative hunting thereof on either side of the null zone; the operating potential applied to the other tube remaining unchanged during such movement.

11. A remote positioning control system for a movable member comprising, in combination, a position selector; a signal transmitter operatively associated with said selector; an actuator effective to position the movable member; an electric motor; mechanism, including relay means, operable to connect said motor to a source of power and mechanically to said actuator; a signal receiver operable in accordance with movement of the movable member; electrical means connecting said receiver and said transmitter; a pair of electronic tubes each connected in circuit relation with one of said relay means and a reference source of alternating current; means including circuit connections for selectively impressing a signal voltage from such reference source on said tubes in response to signals derived by said receiver from said transmitter when said selector and the movable member are out of coincidence to selectively condition said tubes to actuate said mechanism and operate said relay means to energize said motor and connect it to said actuator for rotation in a direction to restore coincidence between the movable member and said selector; a substantially coincident relation of the movable member and said selector corresponding to a null zone in which the resultant effective value of the signal voltage impressed on said tubes is insufficient to condition said tubes to operate said mechanism; a first anti-hunting null shifting circuit arrangement comprising means connected in individual circuit relation with each of said tubes for storing a counter signal potential during movement of said selector and the movable member out of coincidence and corresponding to the resultant relative displacement of said transmitter and receiver, circuit means for impressing such counter signal potential on the associated tube in a direction to oppose such signal voltage during movement of the member and said selector into coincidence, and including means for dissipating such stored counter signal potential, as the member and said selector are moved toward coincidence, at a rate less than the rate of decrease of such signal voltage due to such movement, such counter signal potential exceeding such signal voltage when the member and said selector approach coincidence to shift such null zone in a direction to condition said tubes to operate said mechanism to deenergize said motor and disconnect it from said actuator before the member and said selector attain coincidence, whereby to inhibit relative hunting thereof, the effective signal voltage on the other tube reaching a value insufficient to condition said tubes to effect energization of said motor only when the movable member and said selector have attained substantially full coincidence; and a second anti-hunting null shifting circuit arrangement comprising circuit means individual to each tube and operative upon energization of said relay means to reduce the operating potential applied from such reference source to the associated tube to shift the null zone in a direction to condition said tubes to operate said mechanism to deenergize said motor and disconnect it from said actuator before the member and said selector attain coincidence, whereby to inhibit relative hunting thereof on either side of the null zone, the operating potential applied to the other tube remaining unchanged during such movement; such first circuit arrangement being effective upon relatively large relative displacements of said transmitter and receiver and such second circuit arrangement being effective upon relatively small relative displacements of said transmitter and receiver.

12. A remote positioning control system for a movable member comprising, in combination, a position selector; a signal transmitter operatively associated with said selector; an actuator effective to position the movable member; an electric motor; relay means, operable to connect said motor to a source of power; a clutch operable, simultaneously with energization of said motor, to connect the same to said actuator and, simultaneously with deenergization of said motor, to disconnect the same from said actuator; brake means effective upon deenergization of said motor to arrest motion of said actuator and of the movable member connected thereto; a signal receiver operable in accordance with movement of the movable member; electrical means connecting said receiver and said transmitter; a pair of electronic tubes each connected in circuit relation with one of said relay means and a reference source of alternating current; means including circuit connections for selectively impressing a signal voltage from such reference source on said tubes in response to signal derived by said receiver from said transmitter when said selector and the movable member are out of coincidence to selectively condition said tubes to actuate said mechanism and selectively operate said relay means to energize said motor and connect it to said actuator through said clutch for rotation in a direction to restore coincidence between the movable member and said selector; a substantially coincident relation of the movable member and said selector representing a null zone in which the effective value of the signal voltage impressed on said tubes is insufficient to condition said tubes to operate said mechanism; means connected in individual circuit relation with the anode of each of said tubes for storing a counter signal potential during movement of said selector and the movable member out of coincidence and corresponding to the resultant relative displacement of said transmitter and receiver; and circuit means for impressing such counter signal potential on the associated one of said tubes in a direction to oppose the signal voltage thereon during movement of the member and said selector into coincidence, such counter signal potential exceeding such signal voltage when the member and said selector approach coincidence to shift such null zone in a direction to condition said tubes to operate said relay means to deenergize said motor and disconnect it from said actuator before the member and said selector attain coincidence, whereby to inhibit relative hunting thereof, the effective signal voltage on the other tube reaching a value insufficient to condition said tubes to effect energization of said motor only when the movable member and said selector attained substantially full coincidence.

13. A remote positioning control system for a movable member comprising, in combination, a position selector; a signal transmitter operatively associated with said selector; an actuator effective to position the movable member; an electric motor; differential relay means including a pair of operating coils and a pivoted armature operable to connect said motor to a source of power; an electromagnetic clutch operable, simultaneously with energization of said motor, to connect the same to said actuator and, simultaneously with deenergization of said motor, to disconnect the same from said actuator, and brake means effective upon deenergization of said motor to arrest motion of said actuator and thus of the movable member connected thereto; a signal receiver operable in accordance with movement of the movable member; electrical means connecting said receiver and said transmitter; a pair of electronic tubes each connected in circuit relation with one of said relay operating coils and a reference source of alternating current; means including circuit connections for selectively impressing a signal voltage from such reference source on said tubes in response to signals derived by said receiver from said transmittr when said selector and the movable member are out of coincidence to selectively increase the conductivity of one of said tubes and decrease the conductivity of the other to unbalance the current through said relay operating coils to operate said armature to energize said motor and connect it to said actuator through said clutch for rotation in a direction to restore coincidence between the movable member and said selector; a substantially coincident relation of the movable member and said selector representing a null zone in which the effective value of the signal voltage impressed on said tubes is insufficient to condition said tubes to operate the relay armature; means connected in individual circuit relation with the anode of each of said tubes for storing a counter signal potential during movemnt of said selector and the movable member out of coincidence and corresponding to the resultant relative displacement of said transmitter and receiver; and circuit means for impressing such counter signal potential on the associated one of said tubes in a direction to oppose the signal voltage thereon during movement of the member and said selector into coincidence, and including means for dissipating such stored counter signal potential, as the member and said selector are moved toward coincidence, at a rate less than the rate of decrease of such signal voltage due to such movement; such counter signal potential exceeding the signal voltage on the associated tube when the member and said selector approach coincidence to shift such null zone in a direction to equalize the conductivity of said tubes and the operating currents of said relay coils to operate said relay armature to a neutral position to deenergize said motor and disconnect it from said actuator before the member and said selector attain coincidence, whereby to inhibit relative hunting thereof, the effective signal voltage on the other tube reaching a value insufficient to condition said tubes to effect energization of said motor only when the movable member and said selector have attained substantially full coincidence.

14. A remote positioning control system for a movable member comprising, in combination, a position selector; a signal transmitter operatively associated with said selector; an actuator effective to position the movable member; an electric motor; differential relay means including a pair of operating coils and a pivoted armature operable to connect said motor to a source of power; an electromagnetic clutch and brake unit including a clutch operable, simultaneously with energization of said motor, to connect the same to said actuator and, simultaneously with deenergization of said motor, to disconnect the same from said actuator and brake means effective upon deenergization of said motor to arrest motion of said actuator and thus of the movable member connected thereto; a signal receiver operable in accordance with movement of the movable member; electrical means connecting said receiver and said transmitter; a pair of electronic tubes each connected in circuit relation with one of said relay operating coils and a reference source of alternating current; means including circuit connections for selectively impressing a signal voltage from such reference source on said tubes in response to signals derived by said receiver from said reference source on said tubes in response to signals derived by said receiver from said transmitter when said selector and the movable member are out of coincidence to selectively increase the conductivity of one of said tubes and decrease the conductivity of the other to unbalance the current through said relay operating coils to operate said armature to energize said motor and connect it to said actuator for rotation in a direction to restore coincidence between the movable member and said selector; a substantially coincident relation of the movable member and said selector representing a null zone in which the effective value of the signal voltage impressed on said tubes is insufficient to condition said tubes to operate the relay armature; a first anti-hunting null shifting circuit arrangement comprising means connected in individual circuit relation with each of said tubes for storing a counter signal potential during movement of said selector and the movable member out of coincidence and corresponding to the resultant relative displacement of said transmitter and receiver, circuit means for impressing such counter signal potential on the associated tube in a direction to oppose such signal voltage during movement of the member and said selector into coincidence, and including means for dissipating such stored counter signal potential, as the member and said selector are moved toward coincidence, at a rate less than the rate of decrease of such signal voltage due to such movement, such counter signal potential exceeding such signal voltage when the member and said selector approach coincidence to shift such null zone in a direction to condition said tubes to operate said mechanism to deenergize said motor and disconnect it from said actuator before the member and said selector attain coincidence, whereby to inhibit relative hunting thereof, the effective signal voltage on the other tube reaching a value insufficient to condition said tubes to effect energization of said motor only when the movable member and said selector have attained substantially full coincidence; and a second anti-hunting null shifting circuit arrangement comprising circuit means individual to each tube and operative upon energization of said relay means to reduce the operating potential applied from such reference source to the assocated tube to shift the null zone in a direction to condition said tubes to operate said mechanism to deenergize said motor and disconnect it from said actuator before the member and said selector attain coincidence, whereby to inhibit relative hunting thereof on either side of the null zone, the operating potential applied to the other tube remaining unchanged during such movement; such first circuit arrangement being effective upon relatively large relative displacements of said transmitter and receiver and such second circuit arrangement being effective upon relatively small relative displacements of said transmitter and receiver.

15. A remote positioning control system for a movable member comprising, in combination, a position selector; a signal transmitter operatively associated with said selector; an actuator effective to position the movable member; a direct current electric motor; differential relay means including a pair of operating coils and a pivoted armature operable to connect said motor to a source of direct current; an electromagnetic clutch and brake unit including a clutch operable, simultaneously with energization of said motor, to connect the same to said actuator and, simultaneously with deenergization of said motor, to disconnect the same from said actuator; brake means effective upon deenergization of said motor to arrest motion of said actuator and thus of the movable member connected thereto; a signal receiver operable in accordance with movement of the movable member; electrical means connecting said transmitter and receiver; a pair of electronic tubes each connected in circuit relation with one of said relay operating coils and a reference source of alternating current; means including circuit connections for selectively impressing a signal voltage from such reference source on said tubes in response to signals derived by said receiver from said transmitter when said selector and the movable member are out of coincidence to selectively increase the conductivity of one of said tubes and decrease the conductivity of the other to unbalance the current through said relay operating coils to operate said armature to energize said motor and connect it to said actuator through said clutch for rotation in a direction to restore coincidence between the movable member and said selector; a substantially coincident relation of the movable member and said selector representing a null zone in which the effective value of the signal voltage impressed on said tubes is insufficient to condition said tubes to operate the relay armature; means connected in individual circuit relation with the anode of each of said tubes for storing a counter signal potential during movement of said selector and the movable member out of coincidence and corresponding to the resultant relative displacement of said transmitter and receiver and including means for dissipating such stored counter signal potential, as the member and said selector are moved toward coincidence, at a rate less than the rate of decrease of such signal voltage due to such movement; and circuit means for impressing such counter signal potential on the associated one of said tubes in a direction to oppose the signal voltage thereon during movement of the member and said selector into coincidence, such counter signal potential exceeding the signal voltage on the associated tube when the member and said selector approach coincidence to shift such null zone in a direction to equalize the conductivity of said tubes and the operating currents of said relay coils to operate said relay armature to a neutral position to deenergize said motor and disconnect it from said actuator before the member and said selector attain coincidence, whereby to inhibit relative hunting thereof; the effective signal voltage on the other tube reaching a value insufficient to condition said tubes to effect energization of said motor only when the movable member and said selector have attained substantially full coincidence.

16. A remote positioning control system for a movable member comprising, in combination, a position selector; a signal transmitter operatively associated with said selector; an actuator effective to position the movable member; a direct current electric motor; differential relay means including a pair of operating coils and a pivoted armature operable to connect said motor to a source of direct current; an electromagnetic clutch and brake unit including a clutch operable, simultaneously with energization of said motor, to connect the same to said actuator and, simultaneously with deenergization of said motor, to disconnect the same from said actuator; brake means effective upon deenergization of said motor to arrest motion of said actuator and thus of the movable member connected thereto; a signal receiver operable in accordance with movement of the movable member; electrical means connecting said transmitter and receiver; a pair of electronic tubes each connected in circuit relation with one of said relay operating coils and a reference source of alternating current; means including circuit connections for selectively impressing a signal voltage from such reference source on said tubes in response to signals derived by said receiver from said transmitter when said selector and the movable member are out of coincidence to selectively increase the conductivity of one of said tubes and decrease the conductivity of the other to unbalance the current through said relay operating coils to operate said armature to energize said motor and connect it to said actuator through said clutch for rotation in a direction to restore coincidence between the movable member and said selector; a substantially coincident relation of the movable member and said selector representing a null zone in which the effective value of the signal voltage impressed on said tubes is insufficient to condition said tubes to operate the relay armature; circuit means individual to each tube and operative immediately upon energization of said relay means to reduce the operating potential applied from such reference source to the associated tube to shift the null zone in a direction to equalize the conductivity of said tubes and the operating currents of said relay coils to operate said relay armature to a neutral position to deenergize said motor and disconnect it from said actuator before the member and said selector attain coincidence, whereby to inhibit relative hunting thereof; the operating potential applied to the other tube remaining unchanged during such movement.

17. A remote positioning control system for a movable member comprising, in combination, a position selector; a signal transmitter operatively associated with said selector; an actuator effective to position the movable member; a direct current electric motor; a differential relay including a pair of operating coils and a pivoted armature operable to connect said motor to a source of direct current; a clutch operable upon energization of said motor to connect the latter to said actuator; a signal receiver operable in accordance with movement of the movable member; electrical means connecting said receiver and said transmitter; a pair of grid-controlled electronic tubes each connected in circuit relation with one of said relay operating coils and a reference source of alternating current; means including circuit connections for selectively impressing a signal voltage from such reference source on the control grids of said tubes in response to signals derived by said receiver from said transmitter when said selector and the movable member are out of coincidence to selectively increase the conductivity of one of said tubes and decrease the conductivity of the other to unbalance the operating currents in said relay coils to selectively operate said relay armature to energize said motor and connect it to said actuator through said clutch for rotation in a direction to restore coincidence between the movable member and said selector; a substantially coincident relation of the movable member and said selector representing a null zone in which the effective value of the signal voltage impressed on said tubes is insufficient to condition said tubes to effect energization of said motor; separate means connected in individual circuit relation with the anode and grids of each of said tubes, each operative to store a counter signal potential upon increase in the conductivity of its associated tube during movement of said selector and the movable member out of coincidence and corresponding to the resultant relative displacement of said transmitter and receiver; and circuit means for impressing such counter signal potential on the anode and grid of the associated tube in a direction to oppose the signal voltage thereon during movement of the member and said selector into coincidence, such counter signal potential exceeding the signal voltage on the associated tube when the member and said selector approach coincidence to shift such null zone in a direction to equalize the conductivity of said tubes to effect operation of said relay armature to deenergize said motor and disconnect it from said actuator before the member and said selector attain coincidence, whereby to inhibit relative hunting thereof; the effective signal voltage on the other tube reaching a value insufficient to condition said tubes to effect energization of said motor only when the movable member and said selector have attained substantially full coincidence.

18. A remote positioning control system for a movable member comprising, in combination, a position selector; a signal transmitter operatively associated with said selector; an actuator effective to position the movable member; a direct current electric motor; a differential relay including a pair of operating coils and a pivoted armature operable to connect said motor to a source of direct current; a clutch operable upon energization of said motor to connect the latter to said actuator; a signal receiver operable in accordance with movement of the movable member; electrical means connecting said receiver and said transmitter; a pair of grid-controlled electronic tubes each connected in circuit relation with one of said relay operating coils and a reference source of alternating current; means including circuit connections for selectively impressing a signal voltage from such reference source on the control grids of said tubes in response to signals derived by said receiver from said transmitter when said selector and the movable member are out of coincidence to selectively increase the conductivity of one of said tubes and decrease the conductivity of the other to unbalance the operating currents in said relay coils to selectively operate said relay armature to energize said motor and connect it to said actuator through said clutch for rotation in a direction to restore coincidence between the movable member and said selector; a substantially coincident relation of the movable member and said selector representing a null zone in which the effective value of the signal voltage impressed on said tubes is insufficient to condition said tubes to effect energization of said motor; a pair of capacitances each connected in series circuit relation with an anode and grid of one of said tubes; a pair of impedances each connected in parallel circuit relation with one of said capacitances; the capacitance associated with the tube having increased conductivity, during movement of said selector and the movable member out of coincidence, storing a counter signal potential corresponding to the resultant relative displacement of said transmitter and receiver; such counter signal potential, during movement of the movable member and said selector toward coincidence, being impressed on the anode and control grid of the associated tube in a direction to oppose the signal voltage impressed on the control grid thereof; and said impedance, during such latter movement, dissipating such counter signal potential at a rate less than the decrease in such signal voltage responsive to such movement, whereby such counter signal potential exceeds such signal voltage when the member and said selector approach coincidence to shift such null zone in a direction to decrease the conductivity of the associated tube to equalize the conductivity of said tubes to effect operation of said relay armature to deenergize said motor and disconnect it from said actuator before the member and said selector attain coincidence, whereby to inhibit relative hunting thereof; the effective signal voltage on the control grid of the other tube reaching a value insufficient to condition said tubes to effect energization of said motor only when the movable member and said selector have attained substantially full coincidence.

19. A remote positioning control system for a movable member comprising, in combination, a position selector; a signal transmitter operatively associated with said selector; an actuator effective to position the movable member; a direct current electric motor; a differential relay including a pair of operating coils and a pivoted armature operable to connect said motor to a source of direct current; a clutch operable upon energization of said motor to connect the latter to said actuator; a signal receiver operable in accordance with movement of the movable member; electrical means connecting said receiver and said transmitter; a pair of grid-controlled electronic tubes each connected in circuit relation with one of said relay operating coils and a reference source of alternating current; means including circuit connections for selectively impressing a signal voltage from such reference source on the control grids of said tubes in response to signals derived by said receiver from said transmitter when said selector and the movable member are out of coincidence to selectively increase the conductivity of one of said tubes and decrease the conductivity of the other to unbalance the operating currents in said relay coils to selectively operate said relay armature to energize said motor and connect it to said actuator through said clutch for rotation in a direction to restore coincidence between the movable member and said selector; a substantially coincident relation of the movable member and said selector representing a null zone in which the effective value of the signal voltage impressed on said tubes is insufficient to condition said tubes to effect energization of said motor; separate means connected in individual circuit relation with the anode of each of said tubes, each operative to store a counter signal potential upon increase in the conductivity of its associated tube during movement of said selector and the movable member out of coincidence and corresponding to the resultant relative displacement of said transmitter and receiver; and circuit means for impressing such counter signal potential on the anode and grid of the associated tube in a direction to oppose the signal voltage thereon during movement of the member and said selector into coincidence, such counter signal potential exceeding the signal voltage on the associated tube when the member and said selector approach coincidence to shift such null zone in a direction to equalize the conductivity of said tubes to effect operation of said relay armature to deenergize said motor and disconnect it from said actuator before the member and said selector attain coincidence, whereby to inhibit relative hunting thereof; the effective signal voltage on the other tube reaching a value insufficient to condition said tubes to effect energization of said motor only when the movable member and said selector have attained substantially full coincidence.

20. A remote positioning control system for a removable member comprising, in combination, a position selector; a signal transmitter operatively associated with said selector; an actuator effective to position the movable member; a direct current electric motor; a differential relay including a pair of operating coils and a pivoted armature operable to connect said motor to a source of direct current; a clutch operable upon energization of said motor to connect the latter to said actuator; a signal receiver operable in accordance with movement of the movable member; electrical means connecting said receiver and said transmitter; a pair of grid-controlled electronic tubes each connected in circuit relation with one of said relay operating coils and a reference source of alternating current; means including circuit connections for selectively impressing a signal voltage from such reference source on the control grids of said tubes in response to signals derived by said receiver from said transmitter when said selector and the movable member are out of coincidence to selectively increase the conductivity of one of said tubes and decrease the conductivity of the other to unbalance the operating currents in said relay coils to selectively operate said relay armature to energize said motor and connect it to said actuator through said clutch for rotation in a direction to restore coincidence between the movable member and said selector; a substantially coincident relation of the movable member and said selector representing a null zone in which the effective value of the signal voltage impressed on said tubes is insufficient to condition said tubes to effect energization of said motor; a first anti-hunting null shifting circuit arrangement comprising a pair of capacitances each connected in series circuit relation with an anode and grid of one of said tubes; a pair of impedances each connected in parallel circuit relation with one of said capacitances; the capacitance associated with the tube having increased conductivity, during movement of said selector and the movable member out of coincidence, storing a counter signal potential corresponding to the resultant relative displacement of said transmitter and receiver; such counter signal potential, during movement of the movable member and said selector toward coincidence, being impressed on anode and control grid of the associated tube in a direction to oppose the signal voltage impressed on the control grid thereof; and said impedances, during such latter movement, dissipating such counter signal potential at a rate less than the decrease in such signal voltage responsive to such movement, whereby such counter signal potential exceeds such signal voltage when the member and said selector approach coincidence to shift such null zone in a direction to decrease the conductivity of the associated tube to equalize the conductivity of said tubes and thus effect operation of said relay armature to deenergize said motor and disconnect it from said actuator before the member and said selector attain coincidence, whereby to inhibit relative hunting thereof; the effective signal voltage on the control grid of the other tube reaching a value insufficient to condition said tubes to effect deenergization of said motor only when the movable member and said selector have attained substantially full concidence; and a second anti-hunting null shifting circuit arrangement comprising circuit means individual to each tube and operative upon operation of said differential relay to reduce the operating potential applied from such reference source to the associated tube to shift the null zone in a direction to condition said tubes to operate said relay to deenergize said motor and disconnect it from said actuator before the member and said selector attain coincidence, whereby to inhibit relative hunting thereof; the operating potential applied to the other tube remaining unchanged during such movement; such first circuit arrangement being effective upon relatively large relative displacements of said transmitter and receiver and such second circuit arrangement being effective upon relatively small relative displacements of said transmitter and receiver.

HERMAN NYGAARD.

REFERENCES CITED

The following references are of record in the file of this patent:

UNITED STATES PATENTS

| Number | Name | Date |
| --- | --- | --- |
| 1,942,587 | Whitman | Jan. 9, 1934 |
| 2,154,375 | Chambers | Apr. 11, 1939 |
| 2,287,002 | Moseley | June 16, 1942 |
| 2,085,442 | Newell | June 29, 1937 |